US005271699A

United States Patent [19]

Barré et al.

[11] Patent Number: 5,271,699

[45] Date of Patent: Dec. 21, 1993

[54] PROCESS AND APPARATUS FOR FORMING A WOOD GRAIN PATTERN ON SYNTHETIC LUMBER

[76] Inventors: Guy Barré, 250 Beaconsfield Blvd., Beaconsfield, Quebec, Canada, H9W 4A5; Vigneault, Rémi, 2500 Avenue Pierre-Dupuis, Montreal, Quebec, Canada, H3C 4L1

[21] Appl. No.: 787,123

[22] Filed: Nov. 4, 1991

[51] Int. Cl.[5] .......................... B23C 9/00; B27M 1/02

[52] U.S. Cl. .................................... 409/132; 29/33.5; 83/864; 83/865; 144/2 R; 144/2 J; 144/362; 405/157

[58] Field of Search ...................... 29/33 Q, 33 S, 335; 83/861, 862, 863, 864, 865, 876; 144/1 R, 2 R, 2, 2 J, 3 R, 361, 362, 367, 369, 329; 409/131, 132, 157

[56] References Cited

U.S. PATENT DOCUMENTS

| | | | |
|---|---|---|---|
| 3,081,159 | 3/1963 | Brown | 144/329 |
| 3,125,141 | 3/1964 | Besf et al. | 144/2.5 |
| 3,936,518 | 2/1976 | Soda et al. | 264/45.5 |
| 4,141,944 | 2/1979 | Anstadt et al. | 264/45.5 |
| 4,318,433 | 3/1982 | Amundsen | 144/2.5 |
| 4,655,869 | 4/1987 | Tellman et al. | 144/2.5 |
| 4,691,629 | 9/1987 | Koba | 144/362 |
| 4,790,360 | 12/1988 | Clarke et al. | 144/362 |
| 4,836,254 | 6/1989 | Ruddick | 144/362 |
| 4,858,660 | 8/1989 | Tobeng | 144/362 |
| 5,048,581 | 9/1991 | Pierson et al. | 144/362 |
| 5,129,435 | 7/1992 | Beuving, et al. | 144/362 |

*Primary Examiner*—W. Donald Bray

[57] ABSTRACT

A process and apparatus for forming a wood grain simulation pattern on surfaces of synthetic articles such as synthetic lumber planks. The articles are fed along a predetermined path on a conveyor surface. A plurality of cutting blades are disposed about the periphery of a rotatable cylindrical element supported on a drive shaft. As the synthetic article is fed under the rotatable cylindrical element which is in rotation, the blades which are disposed across an outer surface of the article on which a grain simulation is desired, cut a plurality of short slits spaced laterally from one another in an offset pattern. These slits extend along the feed axis of the article and simulate a wood grain in the outer surface thereof.

17 Claims, 5 Drawing Sheets

PROCESS AND APPARATUS FOR FORMING A WOOD GRAIN PATTERN ON SYNTHETIC LUMBER

BACKGROUND OF INVENTION

1. Field of the Invention

The present invention relates to a process and an apparatus for forming a wood grain simulation pattern on surfaces of synthetic articles and to a novel synthetic wood board made by the process and apparatus.

2. Description of Prior Art

It is known in the art to produce synthetic articles or boards having a wood imitation on one or more surfaces thereof. It is particularly desirable to utilize these products as substitutes for wood in areas where wood can deteriorate quickly due to its environment, such as when used in a ground surface or in contact with water. Another advantage of using synthetic lumber over wood is that there is less maintenance required in keeping a synthetic lumber surface clean and in most instances, the synthetic lumber does not require painting. Another advantage is that synthetic lumber will not warp nor shed sap nor have knots as is the case with lumber and these knots often result in damage to the surface of the lumber which becomes an eyesore. The running of sap is also an eyesore and an inconvenience.

Processes for the production of synthetic lumber and a wood grain imitation is, for example, described in U.S. Pat. Nos. 3,936,518 and 4,141,944. In one of these patents, there is disclosed an extrusion process wherein a formable resin is extruded through a die having an orifice with recesses or grooves around its periphery to form an article having peaks and valleys on its surfaces and while the article is still soft, these peaks are pressed to form portions having high and low densities resulting in a pattern which resembles natural wood. In the other process, the production of the wood layer of the workpiece and then relief embossing texture furrows in portions of the densified covering layer. This type of process is usable for producing articles made only with a synthetic resin having a higher density outer core than the inner core. It is also known to apply an adhesive vinyl on articles, be it plastics or metal, with a pattern printed on the vinyl. It is further known to paint a wood grain imitation on synthetic material or metal, etc.

A further disadvantage of the synthetic lumber above-described having a wood grain imitation thereon is that the surface of the lumber is always relatively smooth. This can be a disadvantage when using the lumber as a flooring as the plastics material is very slippery in its nature and this can cause people to slip and injure themselves.

SUMMARY OF INVENTION

It is therefore a feature of the present invention to provide a process for forming a wood grain simulation pattern on surfaces of synthetic articles, such as synthetic lumber, and which substantially overcomes the above-mentioned disadvantages of the prior art.

A further feature of the present invention is to provide an apparatus for forming a wood grain simulation pattern on a synthetic article, such as above-mentioned disadvantages of the prior art.

A still further feature of the present invention is to provide a synthetic wood board having a wood grain simulation pattern on at least a surface thereof and wherein the pattern is created by slits formed within the surface of the material and oriented to provide a wood grain simulation and simultaneously providing an anti-skid surface.

According to the above features, from a broad aspect, the present invention provides a process for forming a wood grain simulation pattern on surfaces of articles. The process comprises the steps of feeding the article along a predetermined path on a support surface. Short slits are then cut in one or more surfaces of the article with the slits extending along the feed axis of the article and spaced laterally from one another in an offset pattern to simulate a wood grain.

According to a still further broad aspect of the present invention, there is provided an apparatus for forming a wood grain simulation pattern on a synthetic article. The apparatus comprises a support conveyor surface on which the article is conveyed. Drive means is provided for engaging and displacing the article on the conveyor surface along a predetermined path. Cutting disposed transversely across an outer surface of the synthetic article to cut a plurality of short slits and extending along a feed axis of the article to simulate a wood grain in the outer surface.

According to a still further broad aspect of the present invention, there is provided a synthetic wood board which is comprised of an extrusion of plastics material having opposed elongated top and bottom flat parallel walls spaced apart by transverse walls. A wood grain simulation pattern is provided in at least one of the top or bottom surfaces and formed by a plurality of short slits cut therein with the slits extending along the longitudinal axis of the article and spaced laterally wood grain.

BRIEF DESCRIPTION OF DRAWINGS

A preferred embodiment of the present invention will now be described with reference to the accompanying drawings in which.

DESCRIPTION OF PREFERRED EMBODIMENTS

Figure 6:
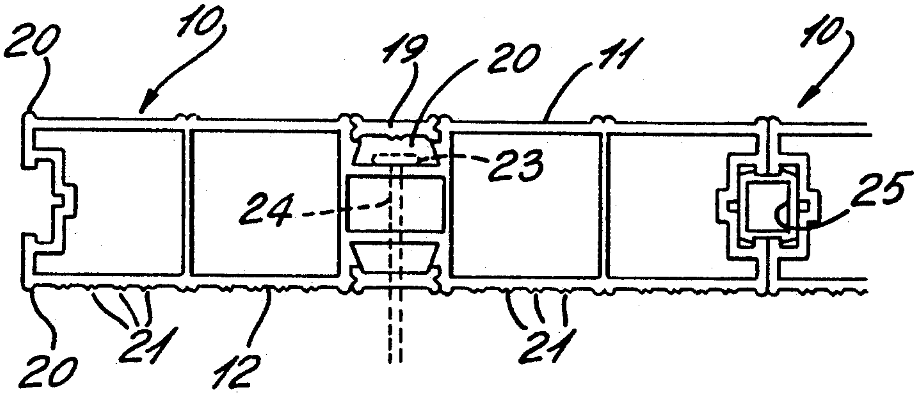
FIG. 6 is an end view showing two synthetic boards interconnected together.

Referring now to the drawings, and more particularly to FIGS. 1 to 7C, there is shown generally at 10, a synthetic wood board constructed in accordance with the process of the present invention. As better shown in FIGS. 2 and 7A to 7C, the wood board is comprised of an extrusion of plastics material and has opposed elongated top and bottom flat parallel walls 11 and 12 and which are maintained spaced apart by transverse connecting walls. The connecting walls consist of two transverse end walls 13 having an elongated channel connector 14. A central fastener receiving channel 15 extends longitudinally in the top and bottom walls 11 and 12 and are aligned back to back with one another. A transverse wall 16 is provided on each side of the receiving channels and a further transverse wall 17 reinforces the opposed wall portions 11 and 12 on each side of these channels 15. The channels 15 are provided with longitudinal grooves 18 on opposed sides thereof adjacent a top edge whereby to retain therein a cover strip 19, as shown in FIG. 6. Longitudinal ribs 20 are also disposed on the top walls and bottom walls 11 and 12. Further anti-skid ribs 21 may be provided on one of these surfaces, as shown in to have a skid-resistant surface. Notches 22 may also be formed in the ribs 20 to provide an anti-skid feature. These are better shown in FIG. 5.

Figure 3:
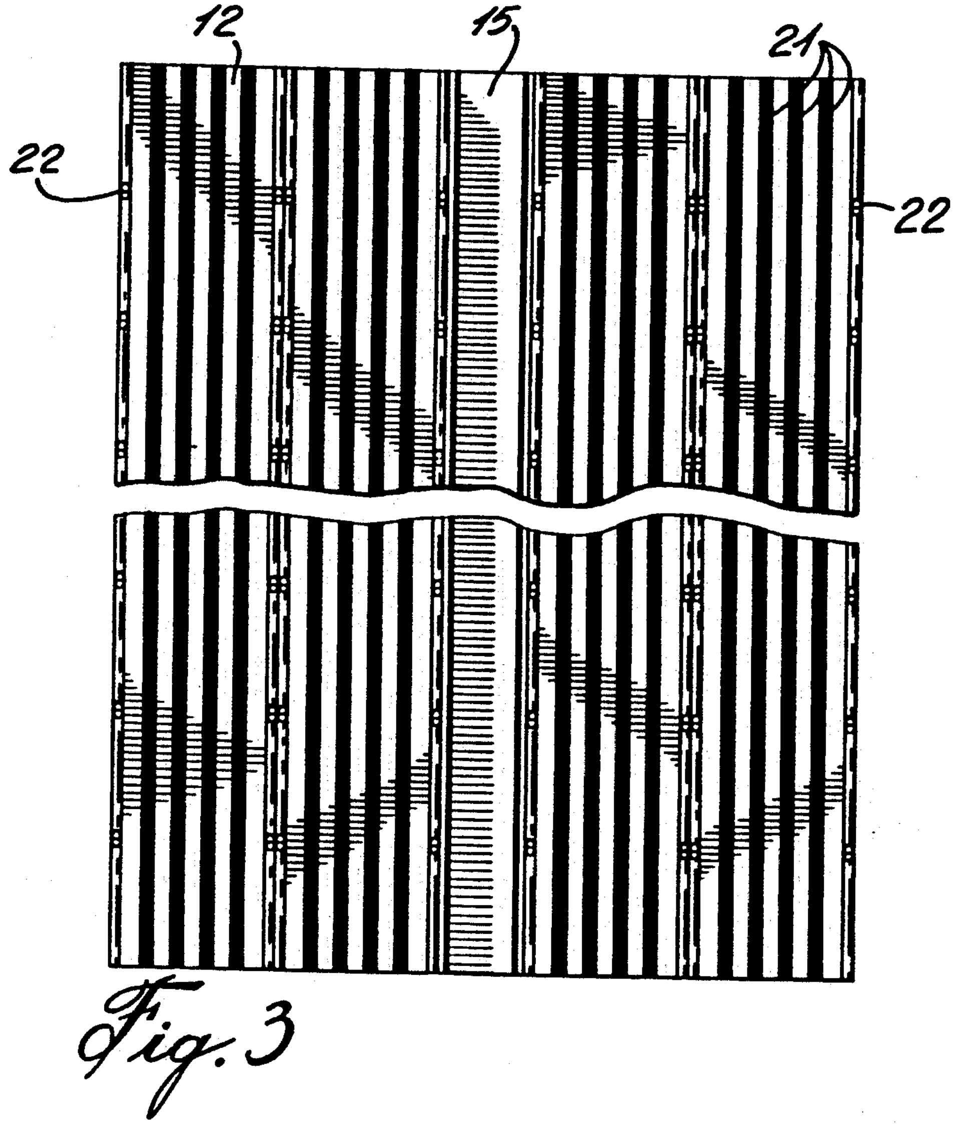
FIG. 3 is a bottom view of FIG. 1.
Figure 4:
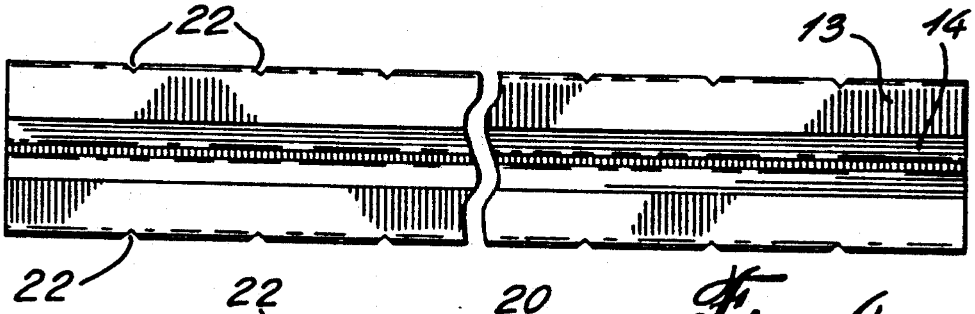
FIG. 4 is a side view of FIG. 1.
Figure 5:
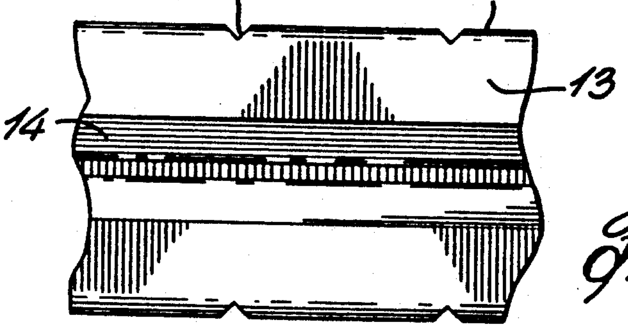
FIG. 5 is an enlarged view of FIG. 4.

As shown in FIG. 6, the cover strips 19 are provided over the channels 15 whereby to conceal the board onto a support material (not shown) but obvious to a person skilled in the art. The boards 10 are also interconnected together along their longitudinal edges by a connector strip 25 which is snap-fitted within the connector channels 14. This prevents the boards from buckling along their mated edges and channels water infiltration towards an end of the board. The boards are also reversible and may have a different pattern on opposed sides as shown in FIGS. 1 and 3.

Figure 7A:
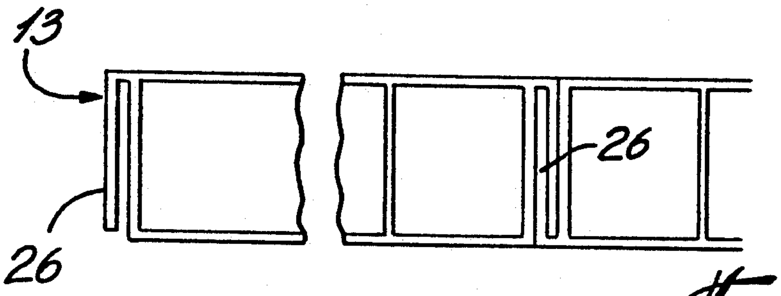
FIGS. 7A, 7B and 7C are fragmented end views showing various types of side wall connectors for interconnecting boards together.
Figure 7B:
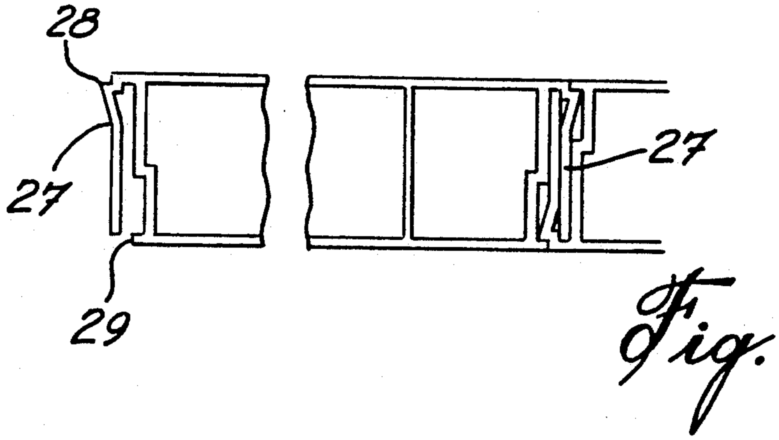
Figure 7C:
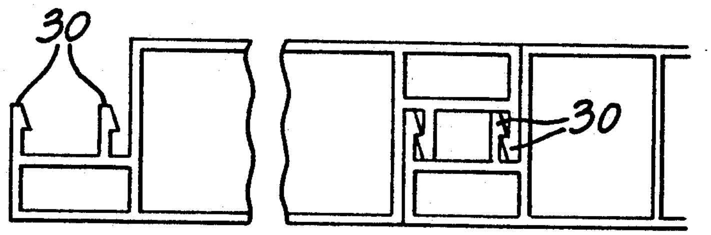

FIGS. 7A through 7C show different types of connectors that may be formed in the end walls 13 of the board. As shown in FIG. 7A, the end wall 13 may be provided with a depending edge flange 26 spaced from the end wall for frictional mating with an inverted edge flange 26 of an adjacent board. FIG. 7B shows an inverted edge flange 27 but having a different configuration with a snap lock notch 28 formed in a corner thereof to engage with a ledge 29 when the flanges shows a further interlocking flange design wherein vertically oriented locking fingers 30 extend upwardly along a horizontal wall extension formed in opposed edges of the board, and inverted from one another, and in a manner to interlock as shown.

Figure 1:
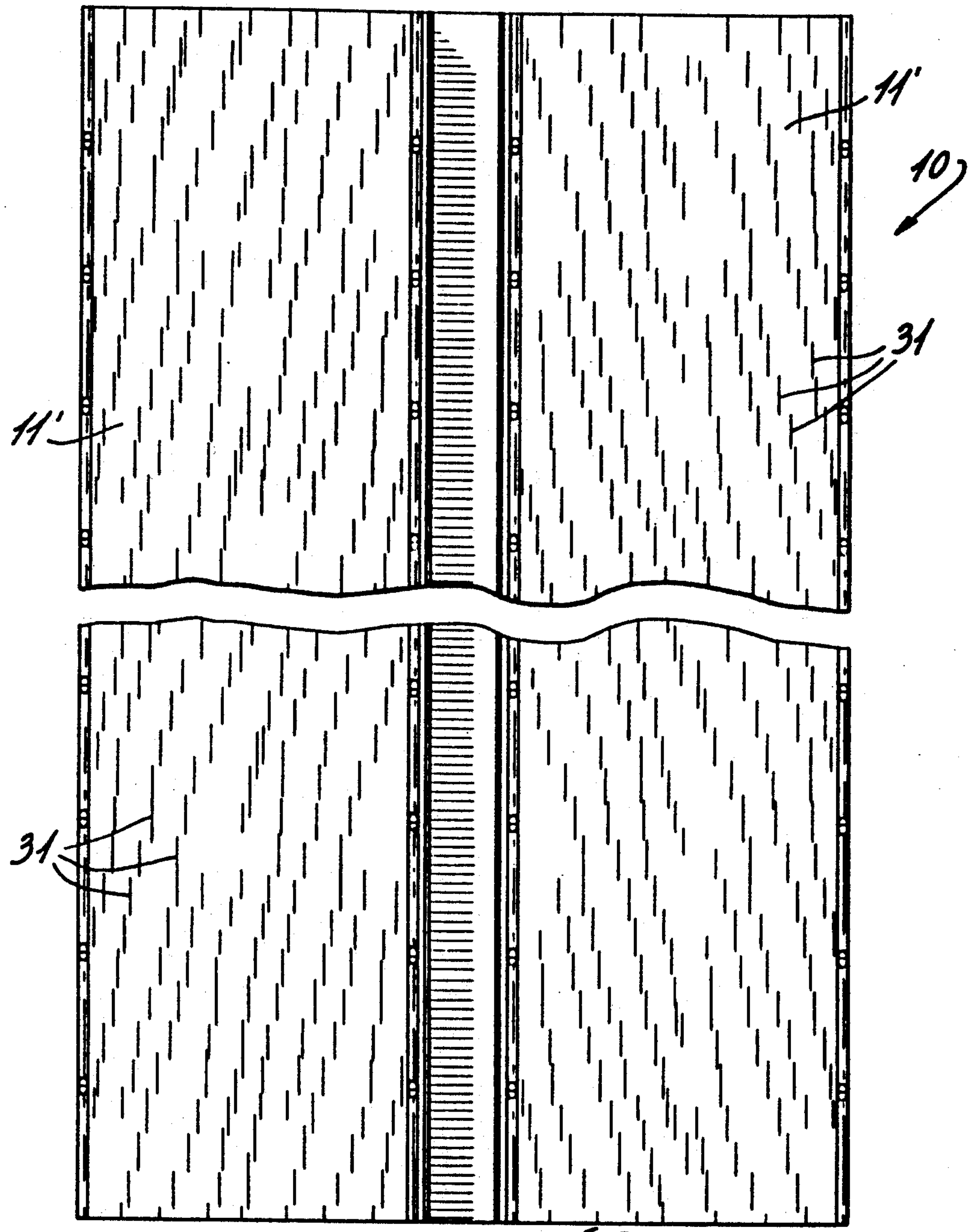
FIG. 1 is a top view of a synthetic wood board constructed in accordance with the present invention.
Figure 12:
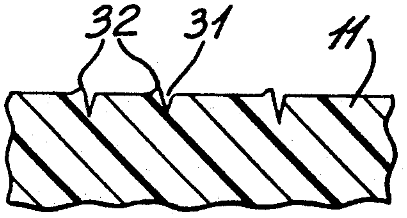
FIG. 12 is an enlarged section view in the surface of a synthetic board having slits cut therein.

As shown in FIG. 1, one of the surfaces of the board, herein the top surface 11, is formed with a wood grain simulation pattern. The wood grain simulation pattern is comprised of a plurality of short slits 31 cut within the surface, as illustrated in FIG. 12, so as to displace the material to form short peaks 32 which produces an anti-slip surface and also produces a slightly roughened surface simulating rough grain which can be felt when the hand is passed on the surface of the board. These slits extend along the longitudinal axis of the board and are spaced laterally from one another and in an offset pattern whereby to simulate a wood grain. The slits 31 may be of equal or different lengths.

Figure 11:
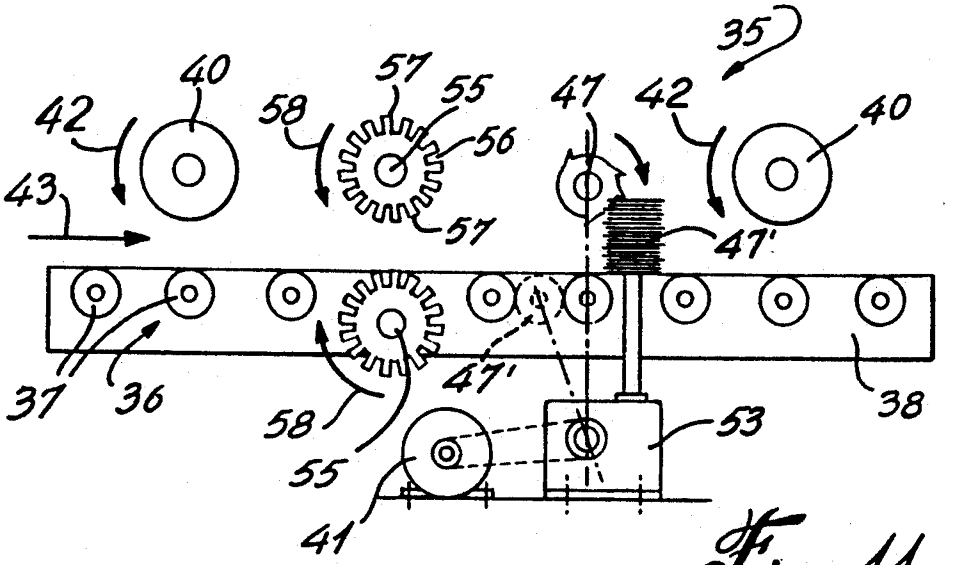
FIG. 11 is a view similar to FIG. 8 but showing the drive coupling.

Referring now to FIGS. 8 through 11, there will be described the process and apparatus for forming the wood grain simulation pattern 31 on synthetic boards, as shown in FIG. 1, or other articles, such as aluminum extrusions, press-wood products, etc. The apparatus is generally shown at 35 in FIGS. 8 and 9 and it comprises a support roller conveyor 36 having a plurality of conveyor roll cylinders 37 freely rotatable between a pair of side frames 38 and defining a conveyor support surface 39 on a top side thereof. A pair of traction rollers 40 having a non-marking, non-slip outer covering are adjustably spaced a predetermined distance above the conveyor support surface 39. Although not shown, these traction rollers are supported on frames whereby to be adjustable vertically dependent on the width of the article to be conveyed on the support surface 39. The traction rollers 40 are coupled to a drive motor 41, as shown in FIG. 11, whereby the rollers 40 are rotated in the direction as illustrated by arrows 42 whereby to advance a board, such as the board 10, over the conveying surface in the direction of arrow 43. Guide means in the form of adjustable guide flanges 44 may be positioned along the conveyor whereby to guide the article along a predetermined path. As herein shown, the guide flanges 44 are mounted on a threaded guide bolt 45 which is actuable by opposed end connectors 46 to displace the guide flanges 44 to their proper positions depending on the width of the board to be processed. Alternatively, the boards can be guided along a predetermined path by the hands of an operator(s).

Figure 10A:
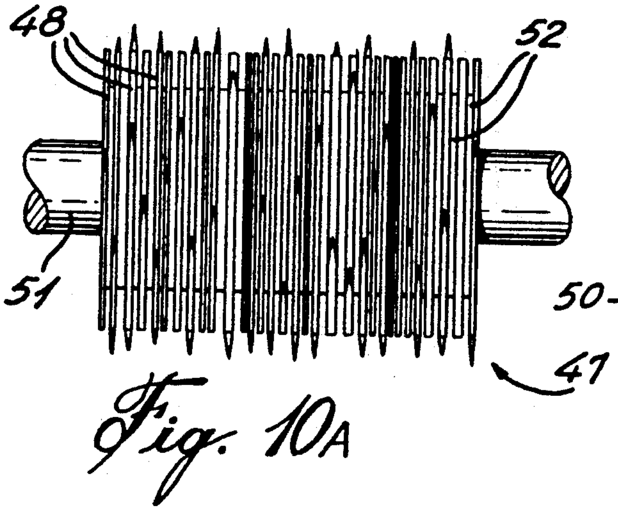
FIG. 10A is an enlarged view of the cutting device.
Figure 10B:
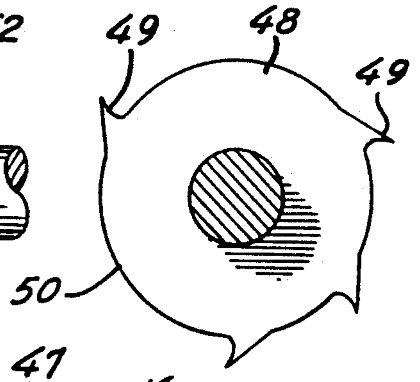
FIG. 10B is a plan view illustrating the construction of the cutting, blades.

Intermediate the traction rollers 40, there is disposed a rotatable cylinder 47 which is formed, as shown in FIGS. 10A and 10B, of a plurality of cutting discs 48 having one or more cutting blades 49 extending about the periphery thereof. These blades 49 are cutting fingers spaced apart a variable distance from one another whereby the slits 31 formed by a complete rotation of each of the cutting discs 48 are spaced apart a variable distance from one another to form staggered slits. As shown in FIG. 10A, some of the cutting discs 48 may also be of a different thickness whereby to form slits that vary in width to provide a better simulation of the wood grain. Furthermore, the cutting blades 49 may project from the outer periphery 50 of the discs a different distance whereby to form slits that are longer or shorter from one another. The cutting fingers are pointed whereby to displace material to form ridges 32 as shown in FIG. 12.

As shown in FIG. 10A, the discs 48 are supported on a driven shaft 51 and are maintained spaced apart by spacers 52. The drive shaft 51 is coupled to the motor 41 directly or through a clutch 53, as shown in FIG. 11. The clutch 53 would permit the drive shaft 51 having the cutting discs thereon to be driven at a slower or faster speed than the traction rolls whereby to produce slits of different lengths within the top surface of the material conveyed on the support surface 39. As shown in FIG. 11, a further cylinder having cutting discs 48′ may also be mounted in the plane of the conveyor cylinders 37 to cut wood simulation slits into the bottom surface of the article being conveyed on the support surface 39.

Figure 2:
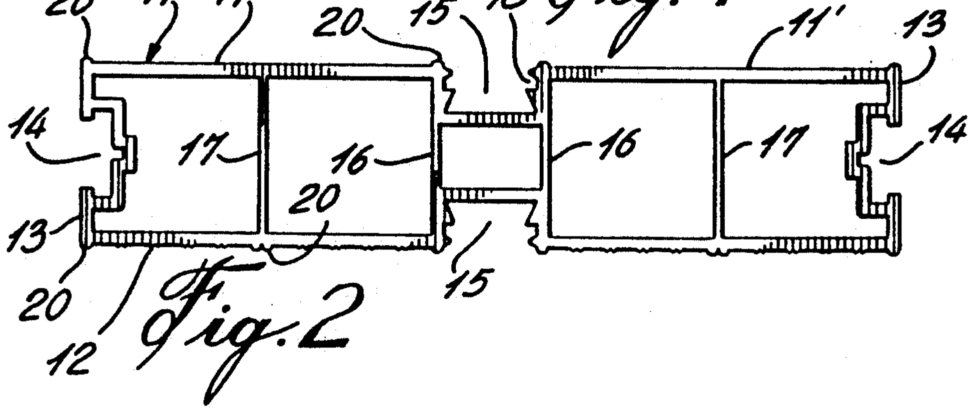
FIG. 2 is an end view of FIG. 1.
Figure 8:
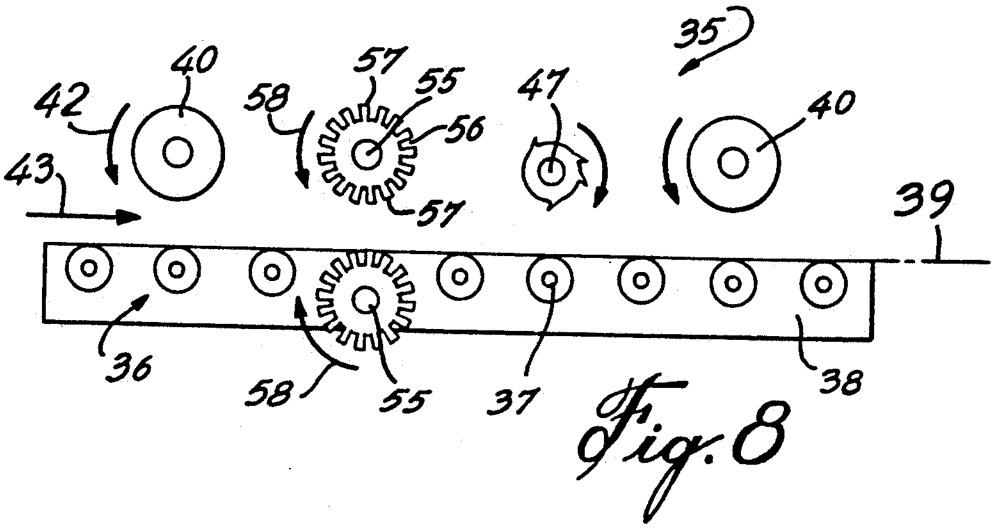
FIG. 8 is a schematic view showing the apparatus for carrying out the process of the present invention.
Figure 9:
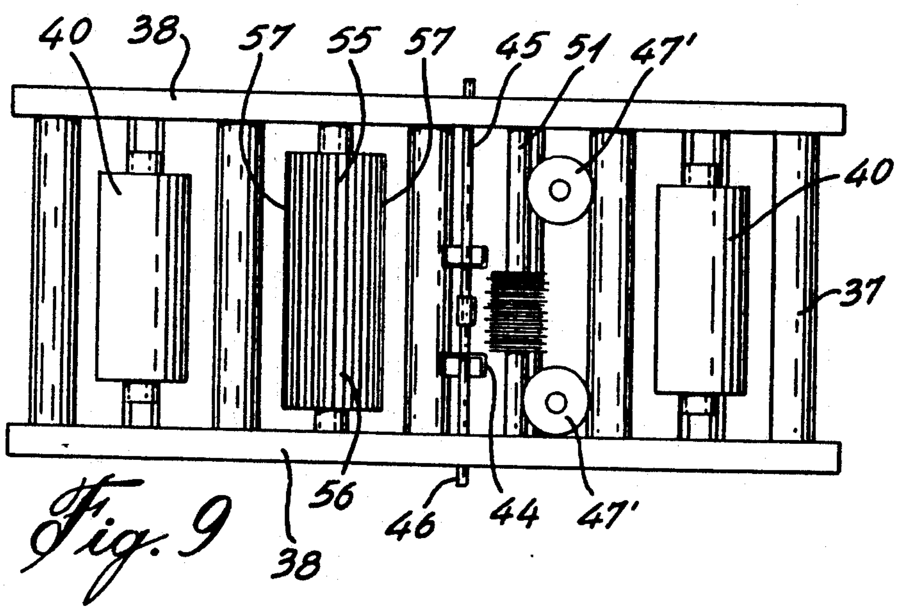
FIG. 9 is a top view of FIG. 8.

Referring now to FIGS. 8 and 9, it can be seen that notch forming cylinders 55 are also disposed in proximity of the top and bottom surface of the board being conveyed on the support surface 39 and these are also adjustable vertically. These notch forming cylinders 55 have a plurality of longitudinal slots 56 provided in the outer surface thereof and in selected ones of which there is inserted a blade 57 having a cutting edge or a blunt edge whereby to form the anti-skid notches 22 in the longitudinal ribs 20 provided on the top and bottom surfaces of the board 10, as shown in FIGS. 1 and 2. The notch forming cylinders 55 are rotated in the direction of arrows 58 and are also driven by the drive motor 41. As shown in FIG. 11, the traction rollers 40, the notch forming cylinders 55 and the cutting discs 48 are all coupled to a common drive motor with the cutting discs being rotated in a counter-direction as the rollers and cylinders.

Briefly summarizing the process of the present invention, articles such as the board 10 shown in FIGS. 1 and 2, are fed on the conveyor support surface 39 by the traction rollers 40 and short slits are made in the top surface thereof by the cylinder 47 formed of cutting discs 48 which are spaced apart therealong whereby to cut short slits in the surface which extend along the feed axis of the article and spaced laterally from one another and in an offset pattern, as shown in FIG. 1. The slits may also be of different lengths and widths and this can be controlled by making the cutting blades longer from one another or else controlling the speed of the cutting cylinder 47 with respect to the drive speed of the plank. Although only one cutting cylinder 47 is herein shown, for the board as shown in FIG. 1, there would be two cylinders 47 provided to cut each top surface portion 11', as shown in FIG. 1. Transverse cutting cylinders 47' may also be positioned to each side of the feed path of the article conveyed on the conveyor support surface 39 to impart slits in side walls of a synthetic article conveyed if a wood simulation was desirable on the side walls of the article as well as on the top and bottom walls. These vertical cylinders would also be adjustable widthwise of the conveyor surface and constructed in the same fashion as the cylinder 47 shown in FIG. 10A.

It is within the ambit of the present invention to cover any other obvious modifications of the preferred embodiment described herein provided such modifications fall within the scope of the appended claims.

We claim:

1. A process for forming a wood grain simulation pattern on surfaces of articles, said process comprising the steps of:

i) feeding said article along a predetermined path on a support surface, and ii) cutting short slits in one or more surfaces of said article with said slits extending along the feed axis of said article and spaced laterally from one another in an offset pattern to simulate a wood grain.

2. A process as claimed in claim 1 wherein said articles are synthetic articles, said step (ii) comprises cutting a plurality of slits of different lengths in said surfaces, said slits being cut by a plurality of rotating cutting elements which are secured to a common support drive shaft disposed transverse to said feed axis above said support surface and spaced side by side and at different peripheral spacing with respect to said drive shaft.

3. A process as claimed in claim 2 wherein said step (i) comprises engaging said article by drive means to feed same along said predetermined path.

4. A process as claimed in claim 3 wherein said step (i) further comprises controlling the speed of said drive means with respect to the speed of rotation of said common support drive shaft supporting said rotating cutting elements.

5. A process as claimed in claim 4 wherein said drive means is one or more drive rolls spaced above a roller conveyor, said drive rolls being coupled to said common support drive shaft supporting said cutting elements and wherein there is further provided the step of controlling the speed of said drive rolls with respect to said common support drive shaft to control the length of said slits.

6. A process as claimed in claim 1 wherein there is further provided the step of notching transverse slots in longitudinal ribs disposed on said surfaces and extending along said feed axis.

7. A process as claimed in claim 2 wherein said step (ii) comprises cutting short slits in at least a top and bottom surface of said article by providing a support drive shaft on opposed sides of said support surface and further wherein short slits are formed in side surfaces of said article by vertically oriented cutting elements also supported on drive shafts disposed to a respective side of said article along said support surface.

8. An apparatus for forming a wood grain simulation pattern on a synthetic article, said apparatus comprising a support conveyor surface on which said article is conveyed, drive means for engaging and displacing said article on said conveyor surface along a predetermined path, cutting means having a plurality of cutting elements disposed transversely across an outer surface of said synthetic article to cut a plurality of short slits spaced laterally from one another in an offset pattern and extending along a feed axis of said article to simulate a wood grain in said outer surface.

9. An apparatus as claimed in claim 8 wherein said cutting means comprises a plurality of cutting blades disposed about a rotatable cylindrical element secured to a drive shaft.

10. An apparatus as claimed in claim 9 wherein said cylindrical support element is formed by a plurality of discs supported on said support drive shaft, some of said discs being cutting discs having one or more cutting fingers formed integral therewith and projecting from an outer periphery thereof.

11. An apparatus as claimed in claim 10 wherein there are three or more cutting fingers about each said outer periphery of said cutting discs, said cutting fingers being spaced apart at a different distance from one another and having a pointed end.

12. An apparatus as claimed in claim 10 wherein spacer discs are disposed between said cutting discs, some of said cutting fingers on each said cutting discs projecting further outwardly than others of said cutting fingers to form slits of different lengths in said outer surface of said synthetic article.

13. An apparatus as claimed in claim 9 wherein said synthetic article is an elongated board-like article having one or more longitudinal ribs extending longitudinally thereof and wherein one or more notch forming means is supported above said outer surface of synthetic articles to form spaced apart notches in said longitudinal ribs.

14. An apparatus as claimed in claim 9 wherein said support conveyor surface is a stationary roller conveyor, said drive means being comprised of two spaced traction rollers adjustably secured above a top support surface of surface of said synthetic article, said cutting means being disposed between said two traction rollers.

15. An apparatus as claimed in claim 14 wherein a further cutting means is disposed under said roller conveyor and has cutting blades extending into said top support surface of said roller conveyor to also cut a simulation of a wood grain in a bottom surface of said synthetic article.

16. An apparatus as claimed in claim 14 wherein said blade support drive shaft and said traction rollers are connected to a common drive motor.

17. An apparatus as claimed in claim 16 wherein a clutch is connected between said blade support drive shaft and said drive motor to vary the rotational speed of said cutting blades with respect to the speed of displacement of said synthetic article to vary the length of said slits in said outer surface of said synthetic article.

* * * * *